& Mathis

United States Patent [19]

Fontanille et al.

[11] Patent Number: 4,845,153

[45] Date of Patent: Jul. 4, 1989

[54] CONDUCTIVE POLYMERS OR PREPOLYMERS FROM A POLYMER CONTAINING ETHYLENIC UNSATURATIONS AND FROM A SILANE COMPOUND AND CONDUCTIVE POLYMERS OR PREPOLYMERS

[75] Inventors: Michel Fontanille, Montmorency; Nicolas Krantz, Bernay; Jean-Claude Gautier, Ablon Sur Seine; Serge Raynal, Draveil, all of France

[73] Assignee: Societe Nationale des Poudres et Explosifs, Paris, France

[21] Appl. No.: 105,449

[22] Filed: Oct. 5, 1987

Related U.S. Application Data

[63] Continuation of Ser. No. 848,138, Apr. 4, 1986, abandoned.

[30] Foreign Application Priority Data

Apr. 5, 1985 [FR] France .................. 85 05219

[51] Int. Cl.$^4$ .................................. C08F 8/00
[52] U.S. Cl. ...................... 525/105; 525/106; 252/500; 528/25; 528/29; 528/31
[58] Field of Search .............. 528/31, 25, 29; 525/105, 106, 288, 342

[56] References Cited

U.S. PATENT DOCUMENTS

| | | | |
|---|---|---|---|
| 3,470,226 | 9/1969 | Plumb et al. | 525/105 |
| 4,080,161 | 3/1978 | Stevens et al. | 524/911 |
| 4,596,668 | 6/1986 | Berbeco | 524/911 |

FOREIGN PATENT DOCUMENTS

| | | | |
|---|---|---|---|
| 0030649 | 3/1978 | Japan | 525/105 |
| 2110706 | 6/1983 | United Kingdom | 525/105 |

Primary Examiner—Wilbert J. Briggs, Sr.
Attorney, Agent, or Firm—Burns, Doane, Swecker & Mathis

[57] ABSTRACT

The invention relates to a process for the preparation of conductive polymers or prepolymers and to conductive polymers or prepolymers.

The process of the invention consists of reacting a polymer containing ethylenic unsaturations such as a hydroxytelechelic polybutadiene with a silane compound of formula

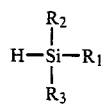

in which $R_1$ denotes a hydrocarbon group containing at least one heteroatom bearing mobile electrons, such as the oxygen of an ether group, and $R_2$ and $R_3$ denote a substituted or unsubstituted organic residue or a group $R_1$.

The polymer obtained is precipitated by the addition of a compound which is not a solvent for the polymer, and is separated from the reaction medium.

The polymers obtained have an electrical conductivity which is multiplied by a factor of $10^5$ relative to the unmodified polymer.

The present invention applies in particular in the field of the polymer industry.

3 Claims, No Drawings

CONDUCTIVE POLYMERS OR PREPOLYMERS FROM A POLYMER CONTAINING ETHYLENIC UNSATURATIONS AND FROM A SILANE COMPOUND AND CONDUCTIVE POLYMERS OR PREPOLYMERS

This application is a continuation of application Ser. No. 848,138 filed Apr. 4, 1986 now abandoned.

The present invention relates to a process for the preparation of polymers or prepolymers which conduct electric current, and conductive polymers or prepolymers.

To make the text clearer, only the term "polymers" will be used to denote, without distinction, the prepolymers which, after polymerization, result in polymers, or the polymers themselves.

The expression "conductive polymers" means polymers having an electrical conductivity or resistivity which is sufficient to permit the flow of electrostatic charges, by means of a leakage current, and to avoid the accumulation of these charges in the material, an accumulation which can give rise to a spark owing to a sudden discharge, as in a condenser. Thus, the volume resistivity of the conductive polymers of the invention is of the order of $10^8$ to $10^{10} \Omega m$, while that of an insulating polymer is $10^{13}$ to $10^{15} \Omega m$, and while that of a conductive material such as a metal is of the order of $10^2$ to $10^3 \Omega m$.

Electrically insulating polymers cannot be used without any precautions to produce articles or coatings which have to be brought into contact with, or stored in the presence of, flammable or explosive products, taking into account the risk of generation of sparks due to the discharge of the electrostatic charges accumulated by these materials.

Conductive polymers, on the other hand, can be used without disadvantages in the circumstances described above.

Ways of making polymers conductive are known, especially by filling them with conductive materials such as metal powders, graphite or carbon or metal fibres.

However, to produce a sufficient degree of conductivity, a high proportion of fillers must be added, and this results in modification of the mechanical properties of the polymer, and even of its resistance to attacks of a chemical nature. Thus, the field of application of these filled materials becomes limited.

The Applicant Company provides a process which makes it possible to make a polymer conductive by a chemical addition of groups comprising atoms bearing mobile electrons, such as, for example, the oxygen atom in the other group. This chemical grafting makes it possible for the mechanical properties and resistance to chemical attacks, which are inherent in the starting polymer, to be substantially retained.

The addition of these groups, which is provided by the invention, is produced by a hydrosilylation reaction between the conductive group bearing at least one Si-H function, and the ethylenic bonds in the polymer.

There are known polymers such as polydienes, to which several groups containing ether functions are added, particularly those described in French Pat. No. 1,497,253. Thus, the process described in this patent consists in adding siloxane groups to the ethylenic bonds in the polymer in a first step, and then, in a second step, substituting the alkoxy groups in the siloxanes by polyether groups. This latter substitution is carried out in the presence of a strong acid, this acid being capable of reacting with other groups in the polymer, especially when the latter contains end groups such as hydroxyl groups. Consequently, this process does not enable polyether groups to be added to polymers which, in addition to the ethylenic bonds, contain other groups which are necessary for the crosslinking or polymerization of the final product, such as, for example, polymers containing hydroxyl or carboxyl end groups, such as hydroxytelechelic polybutadiene (HTPB) or carboxytelechelic polybutadiene (CTPB).

The aim of the present invention is, in particular, to permit the addition of polyether groups to a polymer containing ethylenic bonds, without substantially modifying the mechanical properties of the polymer and without affecting the groups other than the ethylenic groups, by providing a process for the manufacture of these polymers by addition of polyether groups by means of a hydrosilylation reaction.

To this end, the subject of the invention is a process for the manufacture of a polymer which conducts electric current, from a polymer containing ethylenic unsaturations, comprising the following steps:

(a) reacting the polymer containing ethylenic unsaturations, in the presence of a hydrosilylation catalyst, with a silane compound of the following general formula:

in which:

$R_1$ denotes a hydrocarbon group containing at least one heteroatom bearing mobile electrons, and $R_2$ and $R_3$, which may be identical or different, denote a substituted or unsubstituted aliphatic residue, a substituted or unsubstituted organic residue, or a group $R_1$ (b) precipitating the resultant polymer by adding to the reaction medium a compound or mixture of compounds in which the polymer is insoluble, and (c) separating the precipitated polymer from the reaction medium by, for example, decanting, filtering centrifuging or any suitable process of separation.

According to another characteristic of the invention, the group $R_1$ comprises a polymer residue, of general formula:

in which $R_4$, $R_5$ and $R_6$ denote substituted or unsubstituted aliphatic residues containing from 1 to 4 carbon atoms, and n is an integer from 1 to 20.

The preferred groups of the invention are the polyoxyethylene groups of formula:

in which m is equal to 1, 2 or 3, and n is from 1 to 20 and $R_6$ is the methyl, ethyl or propyl group.

For the sake of clarity, the groups of general formula I will be called an ether-silane group, since the preferred substitutent $R_1$ is a group comprising ether functions.

According to another characteristic of the invention, at least some of the ethylenic unsaturations present in the polymer are of the vinyl type, the conductive groups being added preferably to at least some of these vinyl-type unsaturations.

Advantageously, the vinyl-type unsaturations are carried by the carbon atoms forming the polymer chain, the terminal carbon atoms preferably carrying functional groups such as hydroxyl or carboxyl groups, for example, Thus, the ether-silane groups are added only to the unsaturations of the pendent vinyl type, and do not react with the terminal functional groups in the polymer. As a result of this the polymer obtained will remain capable of being polymerized or crosslinked by means of the terminal functional groups and the ethylenic unsaturations which are not saturated by the ether-silane groups.

The ether-silane groups can be added to all the vinyl-type unsaturations present in the polymer. In addition, the ether-silane groups may be added to at most 10% of the ethylenic unsaturations present in the polymer chain (1,4-type unsaturations), without modifying the terminal functional groups.

The polymers which are suitable for the invention are the polymers containing ethylenic unsaturations of the pendent or terminal vinyl type and/or ethylenic unsaturations in the chain. The polymers may also contain other groups, such as hydroxyl or carboxyl groups, for example, these groups being advantageously terminal. As an example of polymers which are suitable for the invention there may be mentioned the polymers obtained by polymerization or copolymerization of diene compounds such as polybutadienes, polyisoprenes, for example, or unsaturated polybutadienes produced by condensation.

The preferred polymers of the invention are the polymers containing ethylenic unsaturations at least some of which are of the vinyl type. These polymers are obtained by polymerization or copolymerization of diene compounds such as 1,2- and 1,4- polybutadienes and 1,2-, 3,4- and 1,4- polyisoprenes.

The preferred polymers of the invention are hydroxytelechelic or carboxytelechelic polybutadienes containing vinyl-type unsaturations.

Polymers containing silylferrocene groups already added to some of the vinyl-type double bonds, the ether-silane groups being added to the other vinyl-type double bonds present in the polymer, can be used as suitable polymers for the invention.

These polymers are described, in particular, in patent application No. 750,076 of 85.06.28, U.S. Pat. No. 4,668,313 filed by the Applicant Company, in the United States of America.

Hydrosilylation catalysts which are suitable for the invention are peroxides, platinum, hexachloroplatinic acid ($H_2PtCl_6.6H_2O$), metal carbonyls such as cobalt carbonyl, nickel carbonyl and the like. The preferred catalyst of the invention is hexachloroplatinic acid.

The compounds or mixtures of compounds which are suitable for precipitating the polymer produced by the first-step reaction are methanol, ethanol, acetone, a mixture of acetone and ethanol or any other compound or mixture which does not dissolve the converted polymer.

The hydrosilylation reaction (step a) may be carried out in a heterogeneous medium and without any solvent, or in a homogeneous medium, by adding to the starting marterials a solvent or mixture of solvents which are common to the polymer and to the ether-silane group.

The preferred solvents of the invention are tetrahydrofuran, benzene, toluene, hexane, and carbon tetrachloride.

The hydrosilylation reaction is preferably carried out at ambient temperature. However, it may be carried out at a lower or slightly higher temperature, depending on the required degree of conversion of the ethylenic bonds, Thus, if the intention is to add ether-silane groups also to the ethylenic bonds other than vinyl-type, it is preferable to perform the reaction at a temperature above ambient temperature.

The number of ether-silane groups of general formula (I) which is used corresponds to the stoichiometric number needed to convert the required number of ethylenic bonds. Advantageously, an excess of approximately 10% of ether-silane groups is added, relative to this stoichiometric number.

However, the yield of the hydrosilylation reaction may not be equal to 100%, as shown by the examples.

The conditions listed above correspond to the embodiment which makes it possible to add ether-silane groups to the vinyl-type ethylenic bonds, without affecting the other groups carried by the polymer or causing crosslinking or briding which would increase the molecular weight of the polymer and its viscosity.

However, if required, the process of the invention makes it possible to add ether-silane groups to the ethylenic bonds present in the polymer chain, by performing the reaction at higher temperatures and by choosing a suitable catalyst and a suitable concentration of the latter in the reaction medium.

The groups of formula I, and especially those containing groups $R_1$ of formula II or III are obtained by means of known processes.

By way of illustration, the ether-silane groups containing a radical $R_1$ of formula III are obtained from monohydroxylated polyoxyethylenes which are available commercially and are sold, in particular, by the Aldrich Company, and have the formula:

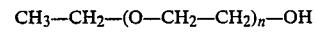

$$CH_3-CH_2-(O-CH_2-CH_2)_n-OH$$

A first process consists in forming a sodium alcoholate by dissolving sodium metal in the polyoxyethylene alcohol, and then reacting this alcoholate with an allyl halide, for example a chloride, to obtain the following compound:

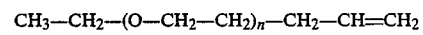

$$CH_3-CH_2-(O-CH_2-CH_2)_n-CH_2-CH=CH_2$$

After this compound has been extracted with an organic solvent, it is reacted with a chlorosilane of general formula:

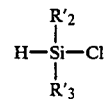

in which $R'_2$ and $R'_3$ have the meaning of $R_2$ and $R_3$ in formula I. However, when $R_2$ and $R_3$ are identical to $R_1$, then $R'_2$ and $R'_3$ denote hydrogen.

The reaction is carried out in the presence of a hydrosilylation catalyst such as hexachloroplatinic acid. The chlorosilane obtained is reduced in the presence of a reduction catalyst such as LiAlH$_4$.AlCl$_3$ in an anhydrous medium.

The compound of general formula I, with an R$_1$ group of formula III, is then obtained, namely:

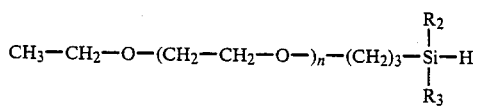

In a second process, the monohydroxylated polyoxyethylene is mixed with the allyl halide in the presence of sodium hydroxide and a catalyst such as tetrabutylammonium hydrogen sulphate (TBAH), for example. These catalysts are usually employed to carry out reactions by means of phase transfer. The following compound is thus obtained:

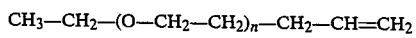

and the preparation of the silyl compound of general formula I is then carried out using the same procedure as in the preceding process.

Lastly, the monohydroxylated polyoxyethylene may be obtained directly by polymerization of ethylene oxide

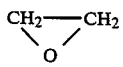

Naturally, it is possible, without departing thereby from the scope of the invention, to use other processes for obtaining the compounds of general formula I, for example from compounds other than monohydroxylated polyoxyethylenes.

The invention will be illustrated better by the following examples, which are given solely by way of indication.

EXAMPLE 1

Preparation of ethylene glycol ethyl 3-(dimethylsilyl)propyl ether

The maximum possible quantity of sodium metal is dissolved in a specified quantity of ethylene glycol monoethyl ether, while the reaction medium is maintained under reflux.

After the heating has been continued approximately 4 hours, a stoichiometric quantity of allyl chloride is added slowly, in the cold. This reaction is highly exothermic and precipitation of sodium chloride is observed.

The sodium chloride is dissolved in water and then an organic solvent such as hexane is added to extract the ethylene glycol ethyl allyl ether.

The organic phase recovered in this manner is washed with water and then dried, for example over a bed of MgSo$_4$.

The solvent is then evaporated off, to recover the ethylene glycol ethyl ally ether. A weight yield of 72% is obtained.

The product obtained has been characterized by infrared and NMR analysis.

A silane group is then added to the double bond of the allyl radical by means of a hydrosilylation reaction. The latter is carried out by dissolving the catalyst (hexachloroplatinic acid (CPA) in dimethylchlorosilane (1 g of CPA in 800 g of dimethylchlorosilane). This solution is then heated to reflux and the ethylene glycol ethyl allyl ether, dissolved in hexane, is run into it.

The hexachloroplatinic acid may also be dissolved in an alcohol such as isopropanol, the alcoholic solution thus obtained being used in an identical manner to the dimethylchlorosilane solution.

The product is recovered by evaporating the solvent and distilling. The yield obtained is 64%.

The chlorosilane thus isolated is then reduced by being run into a suspension of AlCl$_3$-LiAlH$_4$ in anhydrous ether solvents. After reacting for 3 hours in refluxing ether, the excess AlCl$_3$-LiAlH$_4$ complex is destroyed by adding water-saturated ethyl ether, the organic phase being extracted with ether and then dried over MgSo$_4$. This reduction can also be performed by using tetrahydrofuran as the solvent.

After distillation, a colourless product is recovered, which has a boiling point of 87° C. at 15 mm Hg. The yield of the reduction reaction is 95%.

The infrared spectrum of this compound shows a band at 2100 cm$^{-1}$, corresponding to the Si-H bond. NMR analysis confirms that the compound is, in fact

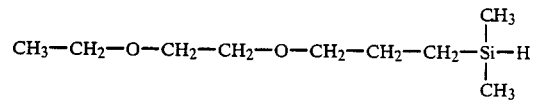

i.e. ethylene glyco ethyl 3-(dimethylsilyl)propyl ether.

Modification of a hydroxytelechelic polybutadiene

The hydroxytelechelic polybutadiene contains two types of ethylenic bonds: on the one hand double bonds between carbon atoms on the polymer chain, originating from a 1,4- polymerization, and double bonds of the pendent vinyl type, due to 1,2- polyermization. The operating conditions described below enable ethylene glycol ethyl 3-(dimethylsilyl)-propyl ether to be added preferentially to the vinyl-type double bonds.

The hydroxytelechelic polybutadiene used in the examples is the polymer marketed by the ARCO Company under the trade names R 45 M or R 45 HT.

The polybutadiene and the ethylene glycol silane ether are intimately mixed and then the catalyst, hexachloroplatinic acid in a pure state or dissolved in isopropanol, is added to the mixture portionwise.

The reaction is allowed to proceed at ambient temperature for 24 hours. The hexachloroplatinic acid concentration obtained at the end of the addition is 2 10$^{-3}$ moles/liter of final solution.

The polymer obtained in this way is then dissolved in hexane and precipitated in a mixture of methanol and acetone. The polymer is then isolated and the last traces of solvent are removed by evaporation under reduced pressure.

The percentage of addition obtained corresponds to approximately 70% of the required percentage corresponding to the quantity of ethylene glycol ether added.

EXAMPLE 2

Preparation of triethylene glycol methyl 3-(dimethylsilyl)propyl ether

The alcohol CH$_3$—O—(CH$_2$—CH$_2$—O)$_2$—CH$_2$—CH$_2$—OH, which has a fairly high viscosity, is mixed with allyl chloride, in a large excess, in the presence of tetrabutylammonium hydrogen sulphate (TBAH) and a 50% by weight solution of sodium hydroxide.

The whole is kept at 40° C. for 4 h with vigorous stirring.

After the reaction has ended, water is added to dissolve the precipitated sodium chloride, and dichloromethane is added to extract the organic phase.

The organic phase thus obtained is distilled at 91° C.

Furthermore, the glass transition temperature of these polymers has also been determined, this characteristic making it possible to evaluate the potential usefulness of the polymer.

These various results are collated in the table below:

| Ex. | ethane-silane $R_6-O-(CH_2-CH_2-O)_{\overline{n}}-(CH_2)_3-\underset{\underset{CH_3}{\vert}}{\overset{\overset{CH_3}{\vert}}{Si}}-H$ | Glass transition temperature | $\rho v$ $\Omega m$ | $\rho s$ $\Omega$ |
|---|---|---|---|---|
| 0 (1) | — | −82° C. | $3.8 \times 10^{13}$ | $4.5 \times 10^{-15}$ |
| 1 | $R_6 = CH_3-CH_2$ $n = 1$ | −83° C. | $1.2 \times 10^{12}$ | $6.9 \times 10^{14}$ |
| 2 | $R_6 = CH_3$ $n = 2$ | −83° C. | $1.1 \times 10^{11}$ | $3.9 \times 10^{13}$ |
| 3 | $R = CH_3$ $n = 3$ | −84° C. | $1.4 \times 10^{9}$ | $7 \times 10^{11}$ |
| 4 | $R_6 = CH_3$ $n = 6$ | −82° C. | $1.3 \times 10^{8}$ | $3.1 \times 10^{11}$ |
| 5 | $R_6 = CH_3$ $n = 11$ | −80° C. | $1.5 \times 10^{8}$ | $5.3 \times 10^{10}$ |
| 6 (2) | $R_6 = CH_3$ $n = 15$ | −80° C. | $2.7 \times 10^{8}$ | $389 \times 10^{10}$ | at 3 mm Hg. The weight yield of the reaction is 95%.

The addition of a dimethylchlorosilane to the double bond of the allyl group and the reduction of the chlorosilane are performed as in Example 1.

Modification of a hydroxytelechelic polybutadiene

The addition of triethylene glycol methyl 3-(dimethylsily)propyl ether to a hydroxytelechelic polybutadiene is carried out using the procedure described in Example 1.

A degree of addition corresponding to 70% of the theoretical amount required is also obtained.

EXAMPLES 3 to 6

Using the method described in Example 2, the products of the following formula have been synthesized:

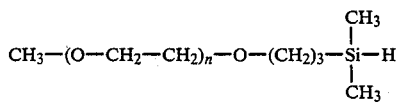

with n equal to 3, 6, 11 and 15.

These compounds have been added to a hydroxytelechelic polybutadiene, using a procedure similar to that described in Example 1. The degrees of addition obtained are comparable to those obtained in Examples 1 and 2.

The hydroxytelechelic polybutadiene employed has an OH functionality of approximately 2.4. A measurement of its functionality after addition of the ether-silane groups shows that it has not been altered.

The electrical conductivity characteristics of the various polymers obtained have been determined by means of the French standard method which consists, briefly, in depositing silver contacts on the polymer surface, these contacts being a specified distance apart, and measuring, on the one hand, the surface resistivity ($\rho s$) between two silver contacts deposited on the same face of the polymer plaque and, on the other hand, the volume resistivity ($\epsilon v$) between two contacts deposited on the opposite faces of the polymer plaque, at a specified voltage which is equal to 500 volts in the present case.

(1) Test 0 corresponds to the measurements carried out on the HTPB polymer before the addition of ether-silane groups (2) 1% of the 1,2- and 1,4- double bonds have been modified This table shows the large increase obtained in the surface and volume resistivity, which is equal to a factor of approximately $10^{-5}$, especially when the group involved in the addition contains more than 4 ether functions, that is to say in the case of silane ethers of triethylene glycol or tetraethylene glycol.

However, the addition of groups containing a high number of ether functions, for example 12 or 16, does not make is possible to obtain a substantial increase in resistivity compared to the increase obtained with groups containing from 4 to 10 ether functions.

Another remarkable point which emerges from these tests lies in the fact that the glass transition temperature of the modified polymer is substantially equal to that of the unmodified polymer.

Thus, a hydroxytelechelic polybutadiene containing 3% of silylferrocene groups, described in previous cited Patent Application (page 7) has been modified according to the process of the invention to graft 17% of ether-silane groups containing 4 ether functions. The glass transition temperature of the polymer obtained in this manner is −81° C., while that of the HTPB with 3% of silylferrocene groups is −65° C.

Other tests and measurements have shown that an addition to approximately 10% of the ethylene bonds in the polymer permits the maximum increase in resistivity to be attained, and a higher degree of addition only makes it possible to reduce the resistivity by a factor of less than 10.

Furthermore, the addition of groups containing a large number of ether functions may lead to demixing phenomena.

For these reasons, the preferred groups of the invention are those containing from 3 to 10 ether functions.

The polymers of the invention, which have a sufficiently low resistivity to prevent the accumulation of electrostatic charges, thus make it possible to produce articles and coatings which can be used even in the presence of flammable or explosive materials, and consequently the invention has made it possible to widen the field of the application and the use of these polymers.

Thus, these polymers can be used as a binder for the manufacture of a protective coating for devices such as, for example, storage vessels, or for the manufacture by means of moulding of articles and devices used in the presence of or in contact with flammable or explosive materials.

Since the resistivity of the polymers of the invention is of the order of magnitude of that of materials used for the manufacture of electronic components, it becomes possible to produce the latter using the polymers of the invention, which permits a cost reduction and an enhanced ease of application.

Lastly, these polymers can be used as a binder and can be filled with materials of all kinds.

We claim:

1. A conductive polymer formed by:
   (a) reacting a polymeric compound containing ethylenic unsaturations in the presence of a hydrosilylation catalyst with an ether silane compound of the following general formula:

(I)

in which:
   $R_1$ denotes a hydrocarbon group containing at least one oxygen atom no oxygen atom being directly bonded to the central silicon atom of said formula (I) and,
   $R_2$ and $R_3$, which may be identical or different, denote a substituted or unsubstituted aliphatic residue, a substituted or unsubstituted organic residue, or $R_1$;
   (b) precipitating the resultant polymer by adding to the reaction medium a compound or mixture of compounds in which said polymer is insoluble; and
   (c) separating the precipitated polymer from the reaction medium.

2. A conductive polymer according to claim 1, wherein at least some of the ethylenic unsaturations are vinyl unsaturations.

3. A conductive polymer according to claim 1, wherein the polymeric compound is a hydroxytelechelic or carboxytelechelic polybutadiene containing vinyl unsaturations.

* * * * *